United States Patent [19]

Thomsen

[11] 3,913,867

[45] *Oct. 21, 1975

[54] WEB HANDLING APPARATUS

[75] Inventor: Jack W. Thomsen, La Grange Park, Ill.

[73] Assignee: Bell & Howell Company, Chicago, Ill.

[ * ] Notice: The portion of the term of this patent subsequent to Aug. 22, 1989, has been disclaimed.

[22] Filed: Jan. 4, 1971

[21] Appl. No.: 103,539

Related U.S. Application Data

[60] Division of Ser. No. 706,243, Feb. 19, 1968, which is a continuation of Ser. No. 550,308, May 16, 1966.

[52] U.S. Cl. .................................................. 242/192

[51] Int. Cl.[2] ...................... G03B 1/04; G11B 15/32

[58] Field of Search .................... 242/192, 195–200, 242/205; 352/156–158

[56] References Cited

UNITED STATES PATENTS

| | | | |
|---|---|---|---|
| 3,149,797 | 9/1964 | Pastor et al. | 242/195 |
| 3,342,432 | 9/1967 | Kaiser et al. | 242/189 |
| 3,429,518 | 2/1969 | McKee | 242/186 |
| 3,489,370 | 1/1970 | Mouissie | 242/198 |
| 3,685,766 | 8/1972 | Thomsen | 242/192 |

*Primary Examiner*—Leonard D. Christian

[57] ABSTRACT

For initiating feeding of a web from a supply reel for threading through said apparatus and for recoil of the web from a take-up reel onto the supply reel, an axially shiftable roller, which is driven in opposite directions, rocks into and out of engagement with (1) the web between the supply reel flanges, and (2) a reel flange, according to its relative axial position.

2 Claims, 12 Drawing Figures

INVENTOR.
Jack W. Thomsen.

INVENTOR.
Jack W. Thomsen.

INVENTOR.
Jack W. Thomsen.
By

WEB HANDLING APPARATUS

This is a division of copending application Ser. No. 706,243, filed Feb. 19, 1968, which, in turn, was a continuation of application Ser. No. 550,308, filed May 16, 1966.

The present invention relates to web handling. Particularly, the invention relates to control means for a web supply member. Specifically, the invention relates to automatic means for removal of the lead end of a web from a supply reel on which the web is coiled and for recoiling removed web portions on such supply reel by reversal or rewinding.

Apparatus of the class with which the present invention concerns itself are adapted for film handling in cinematographic film projectors, tape recorders and the like. In a film projector, such apparatus serves initially to remove a web from a film supply reel for projector threading prior to film projection, and thereafter, either before or after completion of projection, recoil the web on its reel. For web handling operations in a film projector, several general types of mechanisms have evolved heretofore, namely, (1) as exemplified in U.S. Pat. Nos. 2,998,748 and 3,208,682 in which a reel flange is roller driven, (2) as exemplified by U.S. Pat. No. 3,208,682 in which the lead end of a web is directly driven for the purposes of threading a projector and (3) as exemplified in U.S. Pat. No. 3,149,797 in which a reversibly driven roller drives a specially dimensioned web leader for initial removal of a web from its supply reel and reversibly drives the reel flange for web recoil.

To initially remove the lead end of a web from a supply reel for transfer to a take-up reel, and to reverse or rewind on the supply reel, in accordance with the teachings of the prior art, requires a large number, complexly arranged and expensive components and in some cases special web conditioning. In the interest of economy of manufacture and to simplify film projector and tape recorder repair and operation, it is desirable to minimize special web conditioning and also the number and complexity of mechanisms required for handling film and tape in apparatus of the indicated class. In pursuance of such objective, the present invention provides an improved web handling mechanism.

It is another object of the present invention to provide a combination mechanism for initially stripping the lead end of a web from a supply reel for feeding to a take-up station and for reversing or rewinding said supply reel to return thereto therefrom removed web.

It is a further object of the invention to provide in such combination mechanism a single reversible drive.

Additionally, it is an object of the present invention to provide an apparatus of the described class improved stripping means for automatically separating the lead end of the outer convolution of a web from its roll for web transfer to a take-up station.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

Figures 1, 2, 3, 4:
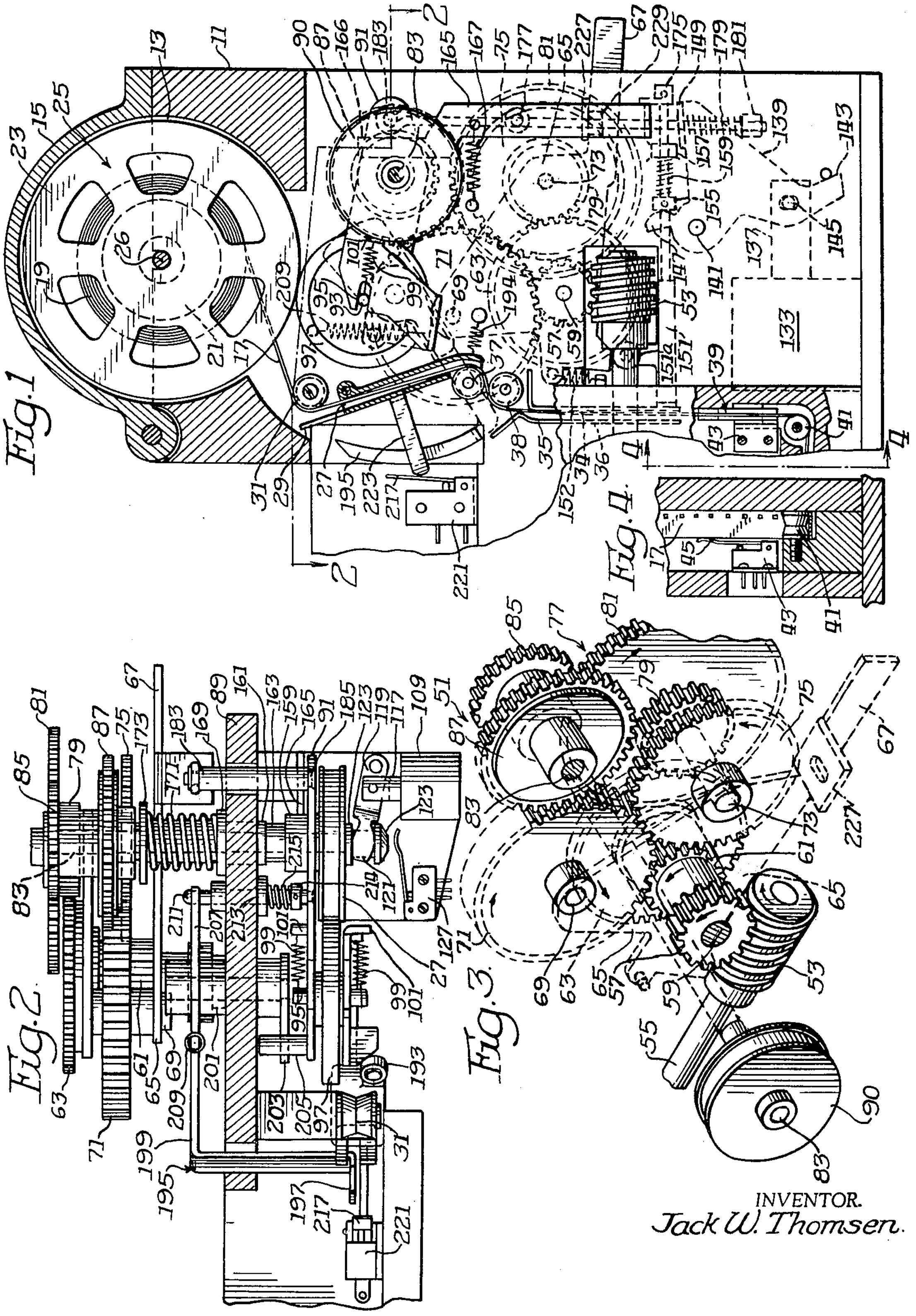
FIG. 1 is a fragmentary vertical section view of a cinematographic projector embodying one form of the present invention conditioned during reel reverse, parts being shown dotted for the purpose of illustration.
FIG. 2 is a horizontal planar projection of a view taken along the line 2—2 of FIG. 1 and looking in the direction of the arrows, with parts shown in post threading condition.
FIG. 3 is a perspective view of the drive transmission for said embodiment, parts being broken away and schematically shown and hidden parts being shown dotted in the interest of clarity.
FIG. 4 is a vertical sectional view taken along the line 4—4 of FIG. 1 and looking in the direction of the arrows.

Referring now more particularly to FIG. 1, the invention is shown increased within a fragmentarily shown cinematographic film projector housing 11 fashioned with a reel chamber 13 to which access is gained by a pivoted chamber cover 15. A conventional film web 17 is arranged in a roll 19 about the hub 21 between opposed flanges 23 of a reel 25. Said reel 25 is rotatably mounted about a horizontal axis 26 within the chamber 13 (FIGS. 1, 6, 7 and 8). For compatibility with the parts of the invention arranged as illustrated, the web is coiled in its roll in a clockwise direction with respect to FIG. 1. The web is drawn from the supply reel 25 through the projector by means which may include a conventional driven take-up reel (not shown).

A rockable track section 27 mounted to direct web 17 for projection in a general downward direction from reel 25 is arranged slightly therebelow in a vertical plane therewith. The track section 27 has an upwardly extending web deflector 29. An idler roller 31 is mounted in slightly spaced relationship with the deflector 29 and arranged in a manner such that the lead end 33 (FIG. 7) of the web 17, when driven from reel 25, will be bent by said deflector about the idler roller 31 and guided into said track section 27.

Figures 7, 8, 9, 10, 11, 12:
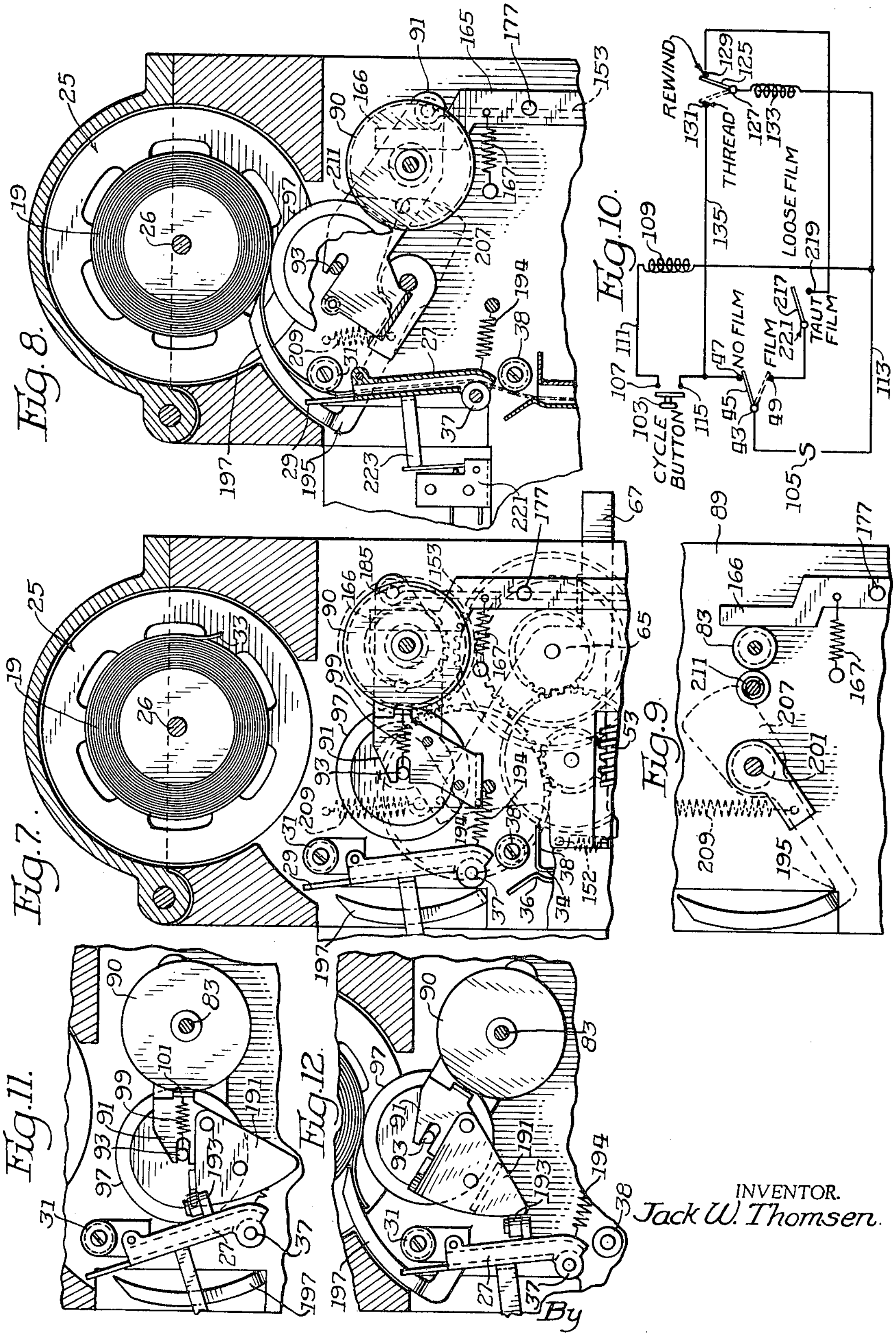
FIG. 7 is a fragmentary sectional view on the plane of FIG. 1, however, showing the embodiment conditioned immediately before stripping of the lead end of the web.
FIG. 8 is a view similar to FIG. 7, however, showing the embodiment conditioned during projector threading.
FIG. 9 is a fragmentary vertical sectional view on a plane parallel to the plane of FIG. 7 for the purpose of illustrating the web stripper of said embodiment.
FIG. 10 is a schematic view of the electrical circuitry for control of said embodiment.
FIG. 11 is a fragmentary vertical sectional view showing the embodiment conditioned as in FIG. 7, however, in a thereto parallel plane for the purpose of illustrating control means for a rockable web track section.
FIG. 12 is a view similar to FIG. 11, however, showing the embodiment conditioned as in FIG. 8.

A vertical fixed web gate 35 is disposed below the rockable section 27 in the plane thereof. The gate 35 may be a conventional assembly of a fixed gate member 36 and a spring biased gate member 34 horizontally adjustable in a manner hereinafter to be described. For the purpose of guiding the web between the lower end of the rockable track section 27 and the upper end of the gate member 35, a web guide roller or snubber 37 is carried in the lower end of track section 27. A cooperating idler roller 38 is arranged relative to roller 37 in a manner such that a proper path will be defined therebetween to direct the lead end 33 during threading (FIGS. 7 and 8).

A right angular track section assembly 39 has a vertical part arranged in web transforming relationship with the lower end of gate 35. The assembly 39 includes a rotatable web guide or snubber 41 (FIGS. 1, 4 and 6) about which the web 17 is adapted to bend into a horizontal path in the projector housing. A web-actuated single pole, double throw electrical switch 43 (FIGS. 1, 4, 6 and 10) is included in the track section assembly 39 and has a switch arm 45 (FIG. 4) disposed in the web path. The switch arm 45 is normally biased against its "no film" pole 47 illustrated in solid line in FIG. 10 and actuated by the film to dotted line position against the "film" pole 49.

To strip the lead end 33 from the web roll 19 for projector threading and to reverse and rewind the reel, torque transmission means comprising a transmission which is generally designated 51 (FIG. 3) is provided. Said transmission 51 is powered by a worm gear 53 which is constrained for rotation with a shaft 55 motivated by a projector motor (not shown). A spur gear 57, which is mounted on a shaft 59 is continuously in mesh with the worm gear 53. An axially elongated gear 61 which is constrained for rotation with the shaft 59 will be thereby motivated. Also constrained for rotation with the shaft 59 is an enlarged gear 63 which is spaced axially on shaft 59 from the elongated gear 61.

A gear support means or mount comprising a gear shaft mounting plate 65 is rockably mounted about the shaft 59 and said shaft mounting plate has an extension 67 by control of which in a manner will be described presently the angular attitude of said plate 65 can be controlled. The angular attitude of plate 65 is also controlled by a cam surface 68 extending therefrom. A shaft 69, which is disposed parallel to the shaft 59 and is rockable with and carried in the upper end portion of plate 65, rotationally supports a reverse gear 71. The latter gear is arranged in continuous driving mesh with the elongated gear 61. The shaft mounting plate 65 also carries a therewith rockable second shaft 73 which is disposed parallel to the shaft 69. A threading gear 75 which is continuously in mesh with the reverse gear 71 is journalled for rotation on the shaft 73 independently thereof. The shaft 73 also provides an axis or rotation for a double gear 77 which is rotatable independently of shaft 73 and comprises a reduced gear segment 79 and a rewind gear 81. The gear section 79 is in continuous driving mesh with the gear 63.

By reason of the aforestated gear arrangement, when the transmission is driven, the reverse gear 71 and the rewind gear 81 will rotate continuously in the ssame direction. The threading gear 75, however, will rotate in an opposite direction. In the present embodiment, the normal angular direction of the worm 53 is clockwise with respect to FIG. 3. Such clockwise movement causes counterclockwise rotation of the shaft 59, clockwise rotation of the reverse gear 71 and the rewind gear 81 and counterclockwise rotation of the threading gear 75.

Figures 5, 6:
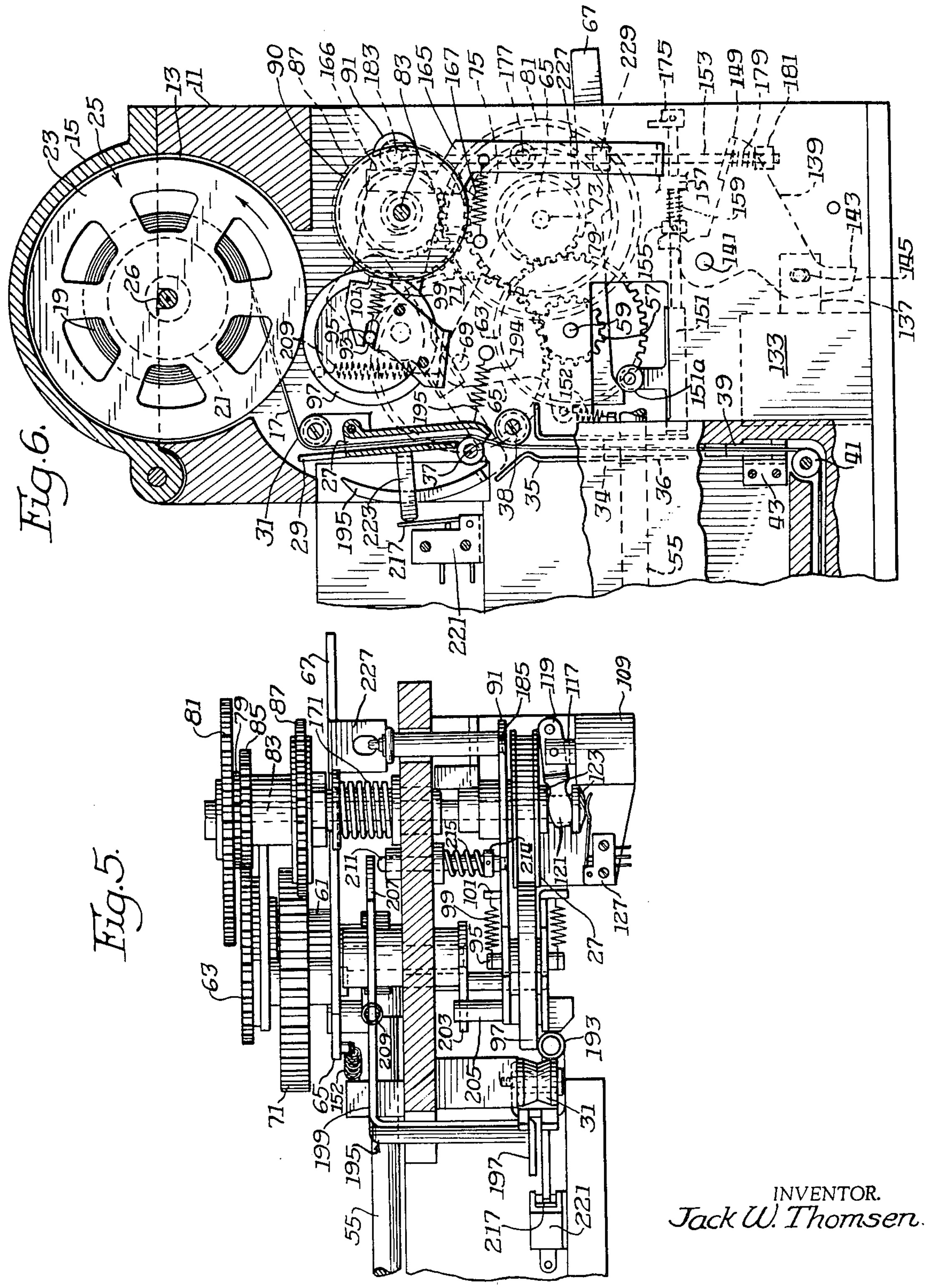
FIG. 5 is a horizontal planar projection of a view similar to that of FIG. 2 with parts shown in threading condition.
FIG. 6 is a fragmentary vertical sectional view of the projector of FIG. 1 with parts shown in rewind condition.

Included in the transmission 51 is a horizontal or output shaft 83 which defines a fixed axis of rotation. Said last shaft is disposed parallel to and above the shafts 59, 69 and 73 and is mounted for shifting to two axial positions illustrated in FIGS. 2 and 5. A pinion 85 and a spur gear 87 are constrained for rotational and axial movement with said last mentioned shaft. The shaft 83, a medial portion or which is shown dotted in FIG. 3, extends across the projector transversely through a medial vertical projector wall 89 (FIGS. 2 and 5). The pinion 85 is arranged and proportioned so that in normal position (FIG. 2), it is conditioned for meshing with the rewind gear 81. Additionally, the gear 87 is arranged and proportioned so that it is aligned for operable meshing with the reverse gear 71, in a manner which will become presently apparent, and it is adapted for operable meshing with the threading gear 75 in the other shifted position (FIG. 5). When either pinion 85 or gear 87 is meshed with respective gear 81 and 75, the other will be inoperatively disposed.

A driver roller 90 is mounted for rotation by the shaft 83 on an end portion thereof opposite pinion 85. A roller mount 91 is disposed normally to the shaft 83 and has a thereabout journalled end portion. The roller mount 91 is mounted for shifting movement with the shaft 83.

An end portion of the roller mount 91 has an outwardly opening slot 93 in which an axis pin 95 is journalled. Roller means defining a friction roller 97 is carried on the axis pin 95, and a pair of springs 99 (FIGS. 2 and 6) bias roller 97 into driven relationship with the driver roller 90. One end of each of the biasing springs 99 is fastened to a boss 101 (FIGS. 1, 2, 5 and 6) which is rigidly secured to the roller mount 91, while the opposite end of each of said springs is connected to the axis pin 95.

The parts are arranged and proportioned in a manner such that the friction roller 97 is normally (FIG. 2) in vertical alignment with one of the reel flanges 23, and upon shifting of said shaft 83 from its normal position to its controlled position (FIG 5), the driven roller 97 will be aligned between the flanges of the reel 25. Accordingly, therefore, when mounting plate 91, which comprises means for moving roller 97, is rocked from its normal attitude which is seen in FIGS. 7 and 11, (by means which will be presently described) to its operating attitude which is seen in FIGS. 1, 6, 8 and 12, roller 97 will be caused drivingly to engage either the reel flange with which it is normally aligned, or, the web roll 19 between the reel flanges 23.

An electrical circuit (FIG. 10) which is employed in the present embodiment to control lead end removal and rewinding includes a button actuated normally open cycle switch 103 which is manually closeable to complete a circuit energized from a current source 105. One of the terminals 107 which is closed by the switch 103 is electrically connected to one side of a shaft shifting solenoid 109 through circuit wire 111. The opposite side of said solenoid is connected to one side of the source 105 through circuit wire means 113. The opposite side of the source 105 is connected to terminal 115 of the cycle switch through the switch arm 45 when the same is in its normal no-film position closed against the pole 47. Accordingly, solenoid 109 can be energized only when the sitch arm 45 is in its normal position. If the cycle switch is then closed, a solenoid core controlled extension 117 will be caused to shift from the position shown in FIG. 2 to that shown in FIG. 5.

One portion of a rockable arm 119 which comprises means for shifting roller 97 is pivotally connected to core extension 117. The opposite end of arm 119 is fashioned as a head 121 which is engaged between a pair of spaced apart bosses 123. The latter are fast on one end portion of the shaft 83. Thereby, the shaft 83 can be shifted between its normal (solenoid de-energized) and controlled (solenoid energized) positions.

The switch arm 125 (FIGS. 2, 5 and 10) of a single pole, double throw "thread-rewind" switch 127 is aligned with the shaft 83 for motivation thereby to the position of FIG. 5 and dotted line position of FIG. 10 against the "thread" terminal 131 of said last switch. Normally, the switch arm 125 is biased against its "rewind" terminal 129 as shown in solid lines in FIG. 10. The thread terminal 131 is connected to one side of a solenoid 133 through the switch arm 125 when in its dotted line position of FIG. 10. The opposite side of said solenoid 133 is connected to one side of the source 105 through circuit wire means 113. The opposite side of the source is connected to the terminal 131 through the switch arm 45 when the latter is in the solid line (no-film) position of FIG. 10 through a circuit wire 135. From the foreging, it is appreciated that the solenoid 133 cannot be energized even though the terminals 115 and 107 are closed if either switch arm 45 is in its dotted line position of FIG. 10 or switch arm 125 is in the solid line position of FIG. 10 unless loose film - taut film switch 221 is closed, in which case the projector will be conditioned for rewind operation to be described later.

A sleeve 159 is secured on shaft 83 on one side of wall 89 in FIGS. 2 and 5. A Journalling member 161 for shaft 83 is arranged in wall 89 with an end spaced from sleeve 159 to generate therewith an annular recess 163 on a common side of wall 89. A rockable arm 165 having an upper locking end 166 (FIG. 9) is biased by a spring 167 to urge said locking end to engage shaft 83. Arm 165 is arranged so that when said shaft 83 is shifted to the position of FIG. 5, said locking end 166 engages in recess 163 to hold the shaft in shifted condition.

The journalling member 161 has a bearing flange 169 engaged against the opposite side of wall 89. Said flange serves as an abutment for one end of a compression spring 171 which is mounted about shaft 83. An annulus 173 fixed to shift with shaft 83 serves as an abutment for the opposite end of the spring 171. The latter is compressed when the shaft 83 shifts from the position of FIG. 2 to the position of FIG. 5 and upon de-energization of the solenoid 109 tends to return the shaft 83 toward its normal position (FIG. 2). However, that may not be done until the arm 165 has been disengaged from the recess 163. That action will occur only when the solenoid 133 is de-energized following threading.

Upon energization of the solenoid 133, its core controlled extension 137 will be retracted from the position shown in FIG. 1. A bracket 139 of general triangular configuration has a downwardly projecting part 143 which is pivotally connected as at 145 to the extension 137. A fixed pivot 141 arranged in the housing 11 provides an axis about which the bracket 139 is rockable through its connection to the solenoid core extension 137.

The bracket 139 carries a pair of horizontal extension members 147 and 149 by which said solenoid 133 controls a pair of connecting rods 151 and 153 (FIGS. 1 and 6). The rod 151 is horizontally disposed and at one end is rigidly secured to the gate member 34 for movement thereof toward and away from the gate member 36. The other end portion of the rod 151 projects through the extension member 147 and has rigidly secured thereto a collar 155. A boss 157, which is fixed relative to the projector housing 11 and spaced from collar 155, is passaged to accommodate the rod 151. A compression spring 159 which has one end in engagement with the collar 155 and the other in engagement with the boss 157 is mounted about the rod 151 and tends to hold collar 155 in engagement with the bracket extension member 147 and simultaneously to bias track member 34 to restricted condition of gate 35. A lifter roller **151*a* is mounted on another extension from rod 151 to control the angular attitude of plate 65 in response to the condition of solenoid 133. Plate 65 is normally urged counterclockwise around shaft 59 by spring 152, so that one of gears 85 or 87 is engaged with one of gears 81 or 75 when roller 151*a*** is positioned so as to allow the plate to rotate.

To release the locking arm end 166 from recess 163, the gate distal end portion of the rod 151 carries a kicker 175 (FIG. 1), said kicker being in alignment with the lower end portion of said locking arm 165. Upon de-energization of the solenoid 133, the solenoid extension 137 moves to the right to the position of FIG. 1 to rock bracket 139 counterclockwise. Accordingly, the rod 151 will return to its normal gate restricted condition under the action of spring 159 to push the kicker 175 against the lower end of said arm 165, thereby to rock said last mentioned arm clockwise with respect to FIG. 1 about its pivot 177 to free shaft 83 to resume its normal position under decompression force of spring 171.

The solenoid 133 through the bracket 139 and vertical rod 153 controls the attitude of the driven roller 97 with respect to the reel 25. To that end, the lower end of connecting rod 153 projects through the bracket extension member 149 (FIG. 1). A compression spring 179 for biasing the connecting rod 153 against the pull of solenoid 133 is mounted about the last mentioned rod. At its opposite ends, said spring 179 bears against the bracket extension member 149 and a collar 181 anchored on the lower end of said last rod below said bracket extension member.

The connecting rod 153 forms part of a torque translation assembly which includes a horizontal connector 183 (FIG. 2) about one end of which the upper end of said last connecting rod is looped. At its opposite end, the horizontal connector is connected as at 185 (FIG. 7) to one end portion of the roller mount 91 to which said connector projects normally. The parts are arranged in a manner such that as the bracket 139 rocks clockwise and counterclockwise with respect to FIG. 1, the mounting plate 91 will rock, respectively, clockwise and counterclockwise about shaft 83. Upon clockwise rotation of the roller mount 91 from the condition of FIG. 7 to the position of FIG. 8, the driven roller will be responsively rocked into frictional engagement with the outer convolution of web roll 19 or its aligned reel flange as in FIG. 1, depending upon the condition of shaft 83.

The parts are arranged and proportioned so that when the shaft 83 is in its normal position, the gear 87 is not alined for mesh with the threading gear 75. However, when the shaft 83 is disposed in its controlled position, and the gear mount 65 is in its normal position (rotated counterclockwise from the position of FIG. 3), the gear 87 will mesh with the gear 75 to cause counterclockwise rotation of the roller 97 which will be then engaged in driving relationship with roll 19 to drive it clockwise to feed the lead end 33 from the reel.

As illustrated in FIGS. 11 and 12, a cam 191 is carried by the roller mount 91 and rocks therewith. A cam follower 193 fast on the rockable track section 27 is held in engagement with the cam by a biasing spring 194. The cam and follower are arranged and proportioned so that as the roller mount is motivated, the cam will rock to urge the track section 27 toward a vertical position to facilitate transference of web 33. From the foregoing it is observed that upon motivation of the roller mount 91 to its controlled position, the bracket 139 correspondingly is rocked. As a consequence, gate 35 opens to facilitate web transference.

To facilitate directing the lead end 33 into the upstream end of the track section 27 during threading, there is provided an elongated web stripper generally designated 195 and formed as a bent arm (FIGS. 2 and 5). The web stripper comprises an arcuately shaped web guide 197 which is disposed on one side of wall 89. The web guide 197 is arranged and proportioned to engage between the lead end 33 and the next outer convolution of roll 19 to direct such lead end away from the roll 19 and guide it against the deflector 29. Said striper 195 has an extension 199 disposed on the side of wall 89 opposite to the side on which the web guide 197 is disposed. A pivot 201 on which the extension 199 is secured is journalled in the wall 89 and provides a rocking axis for the web stripper 195.

An arm 203, which is disposed on the same side of the wall 89 as is the guide 197, is rigidly secured to the pivot 201. A boss or lug 205 which has an end portion rigidly secured in the eccentric end of the roller mount 91 overlays and normally bears against the top of the arm 203 to hold the pivot 201 from rotating and accordingly the stripper 195 from rocking to its normal position to be presently described.

The outer end 207 of the stripper extension 199 is enlarged and weighted (FIG. 9). Such weighted end 207 together with an expansion spring which has one end anchored on said extension and its other end suitably secured above the extension 199 serve to bias the web guide 197 toward its stripping position assumed in FIG. 8. However, the parts are arranged in a manner such that when the roller mount 91 is in its normal position, that is the position shown in FIGS. 7 and 11, the lug 205 will hold the arm 203 at a level which restrains the web guide 197 in non-stripping position (FIGS. 7 and 11).

A blocker 211 (FIGS. 2, 5 and 9) normally engages beneath the weighted stripper end 207 to hold said web stripper 195 from its normal position. While said blocker is in its normal position, the stripper will be retained even though the roller mount 91 has been rocked to remove the lug 205 as a deterrent to stripper movement. As illustrated in FIGS. 2 and 5, the blocker 211 is shiftable axially of shaft 83 with the roller mount 91. Such action occurs because the blocker has an end portion which is secured to a medial part of the roller mount 91 from which said blocker shiftably projects normally through the vertical wall 89. To facilitate management of the movement of the blocker, a compression spring 215 is mounted about the blocker between the vertical wall 89 and the roller 91. The opposite ends of the spring bear against a collar 214 secured to the blocker and a flange 213 secured to the wall 89 about said blocker. The blocker 211 is proportioned in a manner such that when the roller mount 91 is shifted by reason of energization of the solenoid 109, the blocker will disengage the weighted end 207 of stripper 195.

The stripping sequence starts by closing switch 103 provided switch 43 is in no-film condition. Once said sequence has commenced, shaft 83 will shift to controlled position and roller 97 will motivate reel 25 in a feed direction by frictional engagement with web roll 19. The sequence will continue until the lead end 33 has been fed by roller 97 through the projector path into engagement with the switch arm 45. By engaging the outer convolution of roll 19 with roller 97 during stripping, undesirable unravelling of the roll is precluded. Switch arm 45 is arranged along the film path for actuation by the film which will close said last arm to its "film" terminal. Upon such occurrence the circuit to the solenoid 109 is opened and said solenoid accordingly becomes de-energized to return the shaft 83 to its normal position. Upon the latter occurrence, switch arm 125 is released by the shaft 83 and accordingly returns to its normal position against rewind terminal 129. Thereby, the circuit through the thread terminal 131 to the solenoid 133 is opened and said last solenoid is de-energized. Simultaneously, the gear 87 is shifted from engagement with the threading gear 75 to curtail further drive torque through said last gear to the driven roller 97.

Upon de-energization of the solenoid 133, the bracket 139 will be urged counterclockwise with respect to FIG. 1 by reason of the projection of solenoid arm 137 to permit the gate section 34 to assume its normal restricted position for film projection. At the same time, the connecting rod 153 will be elevated to thereby rock the roller mount 91 from the position shown in FIG. 8 to its normal position (FIGS. 7 and 11). As the roller mount rocks away from its threading phase, the boss 205 drives the arm 203 downwardly to rock the stripper 195 counterclockwise from the position shown in FIGS. 8 and 12. As the latter action is occurring, the blocker 211 will be returned to its position in FIG. 2 for holding the stripper 195.

It is appreciated tat the stripping sequence herein described comprises only the initial part of the entire threading operation which may be completed by prior or known means (not shown) that serve to connect the lead end 33 of said web to a drivable take-up reel (not shown). Operation of the latter reel draws the web 17 from the hub 21 of reel 25 to which the trailing or inner end of said web is suitably attached or fastened. After all of the web has been removed from the supply reel 25 except for the trailing end, the drawing torque or the unseen take-up reel will continue to be applied on and cause the web to become taut, as seen in FIG. 6. The track section 27, which is mounted in a manner such that it is sensitive to such tautness, in response thereto, assumes a substantially vertical position.

An actuator member 223 (FIG. 1) is carried by the track section 27 and is rockable therewith. A normally open single pole, single throw taut-film switch 221 is mounted with its switch arm 217 in engageable alignment with the actuator member 223 for motivation thereby into engagement with a terminal 219 of said switch 221. When the switch 221 is closed (FIG. 10), a rewind circuit energizes solenoid 133. The latter circuit is established from one side of the source 105 through circuit wire 113 to one side of solenoid 133 then from the other side of solenoid 133 through the switch 127 which is closed against the rewind terminal 129 through the closed switch 221 through the switch 43 which is then closed against film terminal 49 to the other side of the source 105. While the rewind circuit is energized, the solenoid 109 cannot become energized as switch 43 is closed against terminal 49. Thus during the threading sequence, the arrangement of the circuitry is such that closing of the taut film switch 221 as a result, for example, of rocking the track section 27 under action of cam 191, will have no effect.

The parts are arranged so that when the shaft 83 is in its normal position (FIG. 2), pinion 85 is operably meshed with the rewind gear 81 provided shaft mount 65 is in its normal position to which it is biased by spring 162. Therefore, upon energization of the solenoid 133 by reason of closing of switch 221, because the roller mount 91 will be actuated to effect driving engagement of the roller 97 with its aligned reel flange of the reel 25, the reel will be driven in a rewind direction (counterclockwise with respect to FIGS. 1 and 6).

When the lead end 33 is returned by rewinding beyond the switch 43, said switch will be released to normally close against the terminal 47. Thereupon, the circuitry and accordingly the solenoid 133 will be deenergized whereupon the roller 97 will assume its normal non-operating position.

Reversal of the reel 25 may be effected at a time other than during rewinding in accordance with the present invention. Such reversal is achieved by rocking the gear mount 65 to operably enmesh gear 71 with gear 87 (FIGS. 1, 3 and 6). As that is done, gear 81 will be disengaged from driving relationship with the pinion 85. It is observed that the proportioning of the diameters of the gears is such that a slower angular velocity of the shaft 83 may be achieved during reverse than during rewind.

Operation of the gear mount plate 65 may be effected electrically by a solenoid (not shown) or, as herein illustrated, manually through the handle 67 which is adapted to rock said gear mount 65 clockwise from the position shown in FIG. 7. The handle 67 carries a shelf 227 (FIG. 3) through an aperture in which the connecting rod 153 projects. A collar 229 (FIG. 1) is secured on the connecting rod 153 and engages the lower surface of said shelf 227. Thereby, upon downward movement of the shelf 227, the rod 153 is forced downwardly and accordingly rocks roller mount 91 into reel driving condition by causing engagement of roller 97 with the aligned flange of reel 25.

In the present embodiment, reverse web operation will occur only while the handle 67 is depressed. Thereafter, the gear mount 65 is adapted to return to the normal position therefor shown in FIGS. 7 and 11.

As many substitutions or changes could be made in the above-described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. Web handling apparatus for a device having a web take-up and a double-flanged rotatable supply reel with a coiled web having a leading end carried thereon, comprising:

means for feeding the leading end of the web from the supply reel in one direction for transfer to the web take-up and for recoiling the web in the opposite direction for rewind of removed web onto the supply reel, said means operating during feed of the leading end of the web from the supply reel to frictionally engage the surface of the outer loop of the coiled web between the flanges of the supply reel to drive the leading end of the web in said one direction, said means operating during rewind of removed web onto the supply reel to frictionally engage at least one flange of the supply reel to recoil the web in said opposite direction by rotation of the supply reel; and torque transmission means for selectively driving said first mentioned means.

2. In a cinematographic projector having a self-threading mechanism and a rotatable supply reel with a coiled film having a leading end carried thereon, the improvement comprising:

means for feeding the leading end of the film from the supply reel in one direction to the self-threading mechanism and for recoiling the film in the opposite direction for rewind of removed film onto the supply reel, said means operating during feed of the leading end of the film from the supply reel to frictionally engage the surface of the outer loop of the coiled film within the supply reel to drive the leading end of the film in said one direction, said means operating during rewind of removed film onto the supply reel to frictionally engage the circumferential periphery of the supply reel to recoil the film in said opposite direction by rotation of the supply reel; and torque transmission means for selectively driving said first mentioned means.

* * * * *

UNITED STATES PATENT OFFICE

CERTIFICATE OF CORRECTION

Patent No. 3,913,867 Dated October 21, 1975

Inventor(s) Jack W. Thomsen

It is certified that error appears in the above-identified patent and that said Letters Patent are hereby corrected as shown below:

Column 2, line 37 --increased-- should read --incased--

Column 3, line 7 --transforming-- should read --transferring--

Column 4, line 59 --no-film-- should read --"no-film"--

Column 4, line 61 --sitch-- should read --switch--

Column 5, line 22 --(no-film)-- should read --"no-film"--

Column 5, line 23 --foreging-- should read --foregoing--

Column 7, line 29 --striper-- should read --stripper--

Column 8, line 1 --roller 91-- should read --roller mount 91--

Column 8, line 47 --tat-- should read --that--

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*